United States Patent [19]

Abele

[11] Patent Number: 4,883,919
[45] Date of Patent: Nov. 28, 1989

[54] APPARATUS FOR SEALING CONJOINED CONDUCTORS OF CABLES

[75] Inventor: Berthold W. Abele, Walheim/Neckar, Fed. Rep. of Germany

[73] Assignee: KSA Dichtsysteme GmbH & Co. KG, Vaihingen/Enz, Fed. Rep. of Germany

[21] Appl. No.: 194,240

[22] Filed: May 16, 1988

[30] Foreign Application Priority Data

May 15, 1987 [DE] Fed. Rep. of Germany ....... 3716252

[51] Int. Cl.⁴ .......................................... H02G 15/113
[52] U.S. Cl. .................... 174/93; 174/77 R; 174/92
[58] Field of Search ..................... 174/77 R, 91, 92, 93

[56] References Cited

U.S. PATENT DOCUMENTS

| | | | |
|---|---|---|---|
| 3,158,379 | 11/1964 | Nava et al. | 174/77 R |
| 3,705,950 | 12/1972 | Jirka et al. | 174/93 X |
| 4,103,911 | 8/1978 | Giebel et al. | 174/77 R X |
| 4,216,351 | 8/1980 | Brandeau | 174/92 |
| 4,232,184 | 11/1980 | Faust | 174/92 |
| 4,262,167 | 4/1981 | Bossard et al. | 174/92 |
| 4,387,268 | 6/1983 | Morel et al. | 174/92 |

FOREIGN PATENT DOCUMENTS

| | | |
|---|---|---|
| 7425615 | 11/1974 | Fed. Rep. of Germany . |
| 2421815 | 11/1975 | Fed. Rep. of Germany ........ 174/93 |
| 2440296 | 3/1976 | Fed. Rep. of Germany ........ 174/92 |
| 3626141 | 3/1987 | Fed. Rep. of Germany ........ 174/92 |

Primary Examiner—Morris H. Nimmo
Attorney, Agent, or Firm—Foley & Lardner, Schwartz, Jeffery, Schwaab, Mack, Blumenthal & Evans

[57] ABSTRACT

The apparatus functions to seal joined conductors of cables and includes a plurality of sealing housings each of which has a plurality of varying diameter sealing parts one of which is adapted to lie against the cable in a sealing manner. Each sealing housing consists of detachably connected housing parts, in each of which sealing part sections form the sealing parts. After the housing parts have been joined together, the sealing parts can be selected depending on the diameter of the cable, with the sealing parts fully sealing the cable and the sealing housing.

10 Claims, 4 Drawing Sheets

APPARATUS FOR SEALING CONJOINED CONDUCTORS OF CABLES

BACKGROUND OF THE INVENTION

The invention relates as indicated to an apparatus for sealing conjoined conductors of cables.

For sealing, it is known to wrap a foil around the cable conductors to be wired together, a bitumen coating then being applied to the foil. In addition, other sealing and plastic materials are usually then attached for sealing. This cumbersome and difficult connection and sealing of the cable conductors is above all very unpleasant when it has to be carried out in shafts where it is dark and the oxygen supply is impaired. When the bitumen is heated, unpleasant vapors and smells occur which may lead to a health hazard. In these circumstances it may be that the connection and sealing of the wired cable area is insufficient and a full seal is not guaranteed.

In the apparatus disclosed in German Utility Model No. 7,425,615, the cable conductors which are wired to each other lie in a housing which has a longitudinally split cable inlet connecting piece as the sealing housing. For sealing, elastic sealing rolls are applied as sealing parts to the cable which, when the housing parts are joined together, are to be brought into a form such that they close off the free cross section of the sealing housing. This however does not provide any guarantee that the sealing masses lie both in a sealing manner on the cable and in a sealing manner on the inner wall of the sealing housing. A full seal is thus not guaranteed.

SUMMARY OF THE INVENTION

The object of the invention is to provide apparatus of the type described such that when the housing parts of the sealing housing are joined together a reliable seal is achieved.

In the apparatus according to the invention, for sealing the cables led through the sealing housing, pre-fabricated sealing parts formed from the two sealing part sections are used which can be inserted into the housing parts before they are joined together. The sealing part sections then form the sealing part when the housing parts are joined together. Since the sealing part sections have a predetermined form, it is ensured that, after the housing parts have been joined together, the sealing part fully seals against the cable and the sealing housing. There is therefore no danger that as a result of insufficient sealing, for example, moisture penetrates the apparatus according to the invention. The conjoined cable conductors within the apparatus according to the invention therefore no longer need to be separately insulated and sealed, as the actual insulation and sealing is performed by the sealing part accommodated in the sealing housing. There is no longer any danger of untight places, and the cumbersome connection by winding round with foil and subsequent application of sealing materials can be dispensed with. The sealing housing can be checked for the necessary tightness even before it is used, so that an unnecessary transport to the place of use in question is not required.

Further features of the invention will be apparent from the description which follows, the drawings, and the appended claims.

BRIEF DESCRIPTION OF THE DRAWINGS

The invention will now be described in more detail with reference to an exemplary embodiment illustrated in the drawings, in which.

DETAILED DESCRIPTION OF THE PREFERRED EMBODIMENTS

Figure 1:
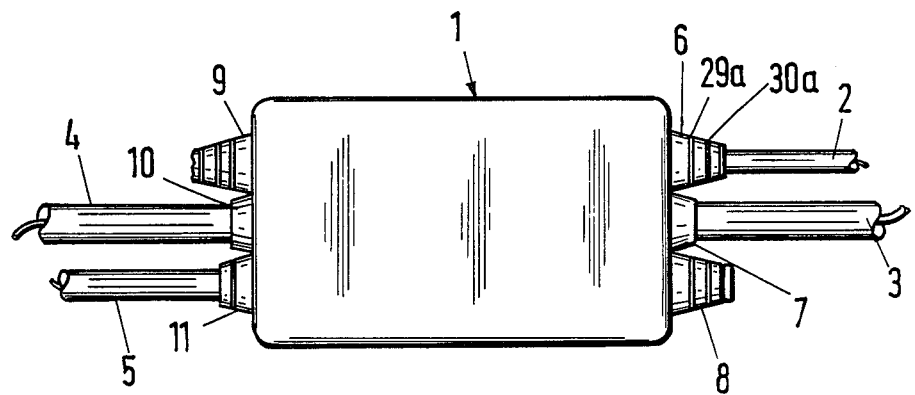
FIG. 1 shows an apparatus according to the invention in elevational view.

FIG. 1 shows an apparatus for sealing and connecting or wiring up cables and cable wires, such as telephone cables, in a branching area, where the cables may be laid above or below the ground. Instead of cables, however, hoses, pipes or channels may also be sealed with the apparatus.

Figure 2:
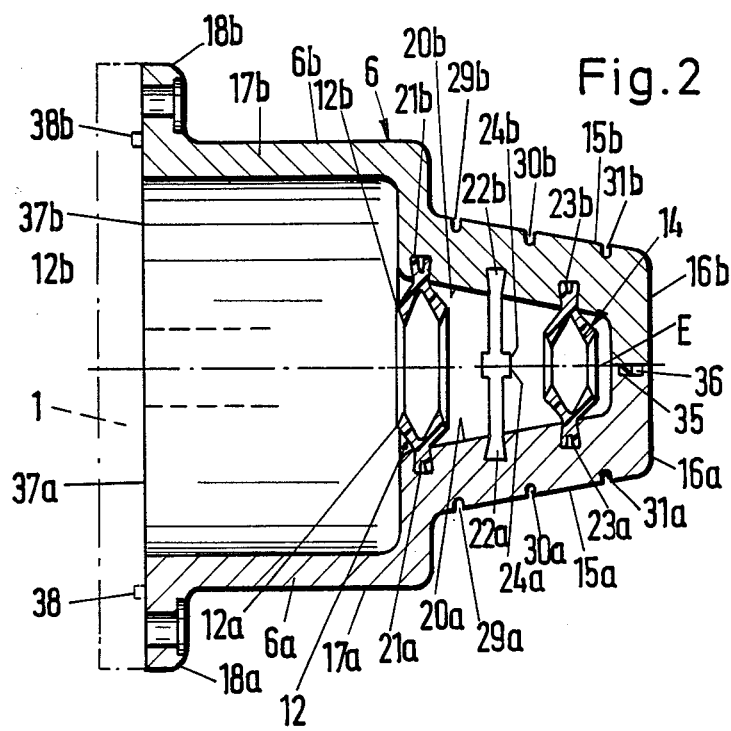
FIG. 2 is a longitudinal sectional view of a sealing housing of the apparatus according to the invention.

The apparatus consists essentially of a cable distributing box housing 1 with inlet apertures for the cables 2 to 5 to be wired together, the inlet apertures being formed by sealing housings 6 to 11, with sealing parts 12 to 14 arranged therein (FIG. 2).

As FIG. 2 shows with reference to the sealing housing 6, the sealing housing consists of two preferably identical housing halves 6a and 6b designed as half shells. The half shells have frustum-shaped tapered end sections 15a and 15b, which merge, through offset connecting shoulders, into cylindrical transition sections 17a and 17b for attaching to the cable distributing box housing 1. The transition sections 17a, 17b have a radially extending retaining flanges 18a, 18b which extend essentially over the entire circumference of the halves 6a, 6b. The retaining flanges 18a, 18b each run between two edges 19a, 19a' (FIG. 3) of the halves 6a, 6b, extending axially over the entire height of the transition section 17a, 17b, with which these halves lie flush and in a sealing manner against each other when the sealing housing 6 is mounted.

Figure 3:
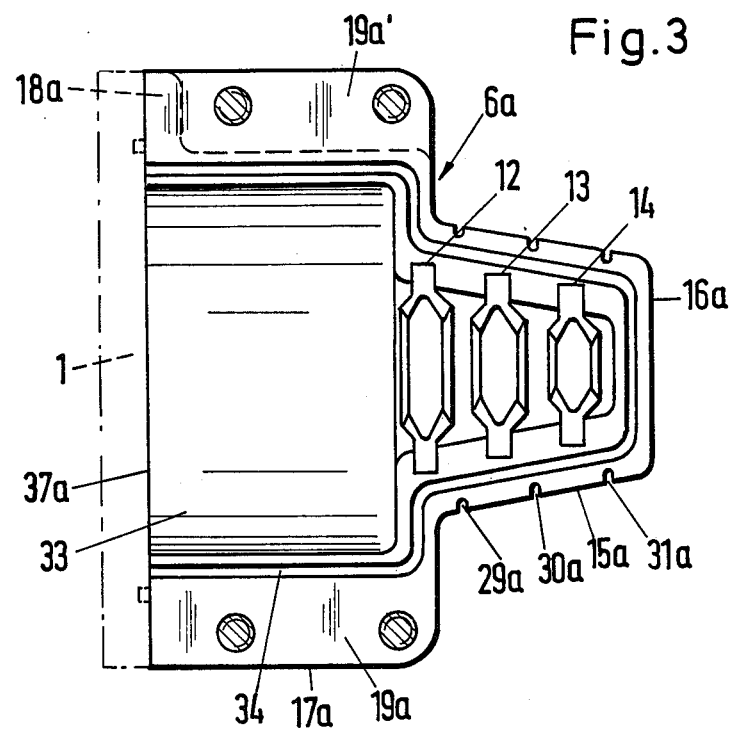
FIG. 3 shows a half of the sealing housing according to FIG. 2, in top plan view looking on its inner side.

As FIGS. 2 and 3 further show, the halves 6a, 6b have on the inner sides 20a, 20b of their tapered end sections 15a, 15b circumferential receiving grooves 21a to 23a and 21b to 23b, in which in each case one of the sealing parts 12 to 14 is retained. As can be seen clearly with reference to the receiving grooves 22a, 22b, in which no sealing part is arranged in order to more clearly show the design of the receiving grooves, the receiving grooves 21a to 23a and 21b to 23b taper in the direction of the junction plane E of the sealing housing, so that a secure retention of the sealing parts 12 to 14 in the receiving grooves is ensured. As can be seen further with reference to the receiving grooves 22a, 22b, the grooves have in the area of their ends 24a, 24b approximately the same width across their entire depth, so that the sealing parts 12 to 14 can engage there with thickened ends 25 to 28 (FIGS. 4, 5) of sealing sections 29 (FIG. 6). The receiving grooves 21a to 23a and 21b to 23b are arranged serially with axial spacing. Their inside diameter decreases from the transition sections 17a, 17b axially outwards preferably to the same degree as the end sections 15a, 15b taper outwards. The first receiving grooves 21a, 21b with the largest inside diameter serve to receive the sealing part 12 which seals the cable with greater diameter, for example from 16 to 20 cm, compared to the sealing parts 13 and 14. The sealing part 12 lies at the level of the transition from the end sections 15a, 15b to the transition sections 17a, 17b, while the sealing part 13 lies approximately halfway along the end section 15a, 15b.

The sealing part 13 serves, for example, to seal cables with a diameter of 12 to 16 cm, while the smallest sealing part 14 is provided to seal cables with diameters of around 8 to 12 cm. The sealing part 14 is spaced from the bases 16a, 16b, designed as a closure plate for the end sections 15a, 15b.

The end sections 15a, 15b have preferably three circumferential grooves 29a to 31a and 29b to 31b which lie in radial planes which are arranged respectively between the receiving grooves 21a, 21b and 22a, 22b; grooves 22a, 22b and 23a, 23b; and between the latter and the bases 16a, 16b. The circumferential grooves form predetermined breaking points at which a part of the end sections 15a, 15b or the sealing housing 6 can be cut off. Thus, for example, when the apparatus is used, if the sealing housing 6 and the cable 2 (FIG. 1) and the sealing part 14 is to be used or sealed, only the base 16a, 16b is cut off. Thus the end section 15a, 15b is cut at the predetermined breaking points 31a, 31b. If however a thicker cable is to be used in the sealing housing 6, then the end section 15a, 15b is cut off at the circumferential groove 30a, 30b or 29a, 29b respectively, depending on the thickness of the cable to be sealed.

As FIG. 3 shows, the housing half 6a has in its inner edge area bounding the shell aperture 33a separating line designed as a groove 34, into which a seal 35 (FIG. 2), such as, for example, a sealing strip, is inserted. It can be laid, tied, glued or vulcanized in the groove 34. The seal 35 is of such a thickness that it projects above the groove 34 and the junction plane E of the sealing housing 6, respectively. When the housing halves 6a and 6b are screwed together, the seal 35 is pressed together elastically, so that the separating area between the housing halves is fully sealed. The groove 34 preferably tapers in the direction of the junction plane E in accordance with the receiving pieces 21a to 23a and 21b to 23b of the sealing parts 12 to 14, so that the seal 35 cannot unintentionally fall out of the groove 34.

The sealing housings 6 to 11 consist preferably of a material which is damp-proof and preferably also warmth-proof and heat-proof as well as gas-diffusion-proof. The material may further comply with electrical safety regulations and have a certain elasticity. Appropriate plastics and also aluminum are preferably used and suitable for those purposes. The cable distributing box housing 1 consists preferably of the same material as the sealing housings 6 to 11 which are screwed to the housing 1. A circumferential seal 38a, 38b (FIG. 2) projects over the front faces 37a, 37b of the housing halves 6a, 6b, so that the sealing housing 6 is sealed against the cable distributing box housing 1. The cable distributing box housing 1 consists, as do the housings 6 to 11, of two halves (not shown), whose junction planes coincide with the junction plane E of the sealing housing 6. The junction level preferably lies in the longitudinal center plane of the housing 1, so that the housing halves can simply be placed on the cables 2 to 5 to be connected.

It is particularly advantageous if the sealing housings 6 to 11 are designed integrally with the cable distributing box housing 1, since then no sealing problems occur in the transition area between the housing 1 and the housings 6 to 11.

The sealing parts 12 to 14 are of identical design except for their different dimensions. They preferably consist of elastomeric material and have sealing lips 38 to 41 (FIG. 6) with a special lip geometry which ensures that the sealing parts 12 to 14 also fully seal cables of non-round cross section.

Each sealing part 12 to 14, of which only the sealing part 12 is illustrated in FIGS. 4 to 9, consists of two identical halves 12a, 12b, one being secured in one housing half 6a and the other secured in the other housing half 6b in one of the pairs of corresponding receiving grooves 21a to 23a and 21b to 23b.

As described above, the sealing parts 12 to 14 are secured under pretension with a securing section 29 in the receiving grooves. For this purpose, the securing section 29 has two V-shaped legs 42a, 42b and 43a, 43b, which project radially outwards from the radial center plane of the sealing part. The legs are pressed together elastically in the receiving part and thus, in conjunction with the outwardly tapering receiving grooves, ensure a secure fitting of the sealing parts in the receiving grooves.

Figure 7:
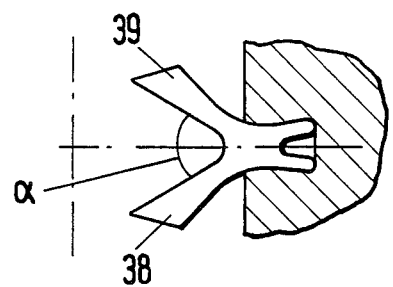
FIG. 7 shows a half of a seal according to FIGS. 4 to 6 in fitted position prior to sealing.
Figure 8:
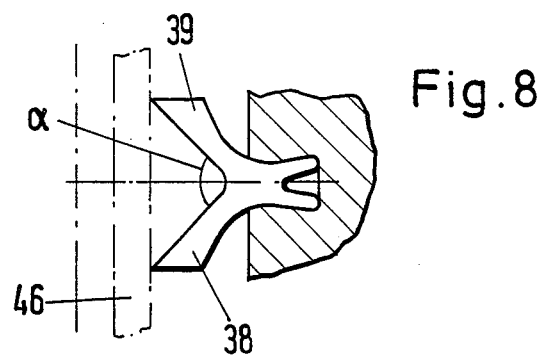
FIG. 8 shows the seal according to FIG. 7 in a first sealing position.
Figure 9:
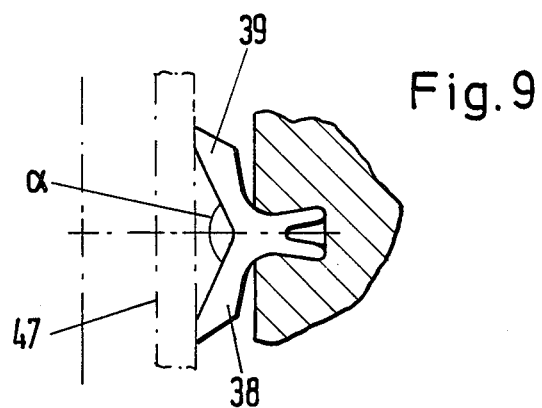
FIG. 9 shows the seal according to FIGS. 7 and 8 in a second sealing position, in which a cable with a larger diameter than in FIG. 8 is sealed.

The sealing lips 38 to 41 project in the opposite direction to the legs 42a, 42b and 43a, 43b, that is, radially inwards, and similarly extend in a V shape from a root area 44, 45. From here, the sealing lips 38 to 41 widen, or thicken, inwards in the direction of the sealing part axis A in such a manner that the sealing lips have an approximately triangular shape in section. The sealing lips consequently have their smallest thickness in the root area 44, 45, so that the sealing lips can be spread apart easily and without great force, in order to lie properly against the cable to be sealed. The radial pressing force of the sealing lips is greater when the angle $\alpha$ between the axial neighboring sealing lips 38, 39 or 40, 41 respectively is smaller, and the sealing lips are thicker. As FIGS. 7 to 9 show, the wider the sealing lips 38 to 39 are spread apart, the greater the diameter of the cable 46 or 47 respectively (FIG. 8, 9) to be sealed is. When a cable 46 with a diameter of, for example, approximately 8 cm is sealed, the sealing lips 38, 39 are bent radially outwards (FIG. 8) from their initial position (FIG. 7), so that the angle $\alpha$, becomes greater in relation to the angle $\alpha$ of the unformed seal. When a cable 47 with a diameter of, for example, 12 cm (FIG. 9) is sealed, the sealing lips 38, 39 are spread even further apart, so that the angle $\alpha$ between the sealing lips becomes even greater, in the exemplary embodiment being greater than 90°.

The separated sealing lips 38 to 41 guarantee that the cables will be fully sealed even if they, for example, are curved in the area of the sealing parts. Depending on the direction of curvature, the sealing lips 39 and 40 or 38 and 41 lying transversely opposite each other always lie against the cable to be sealed. This ensures a full seal in every case.

Figure 4:
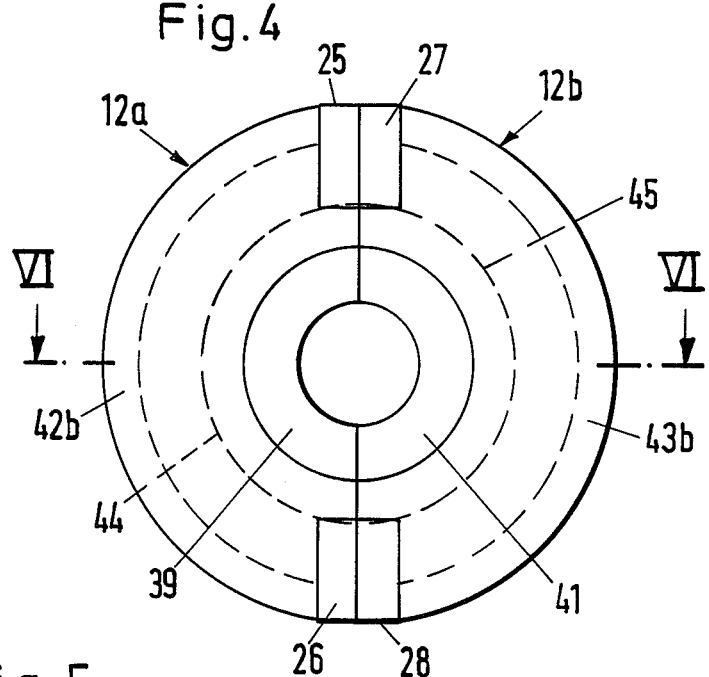
FIG. 4 shows a seal of the apparatus according to the invention according to FIG. 1, seen in the direction of the sealing axis.
Figure 5:
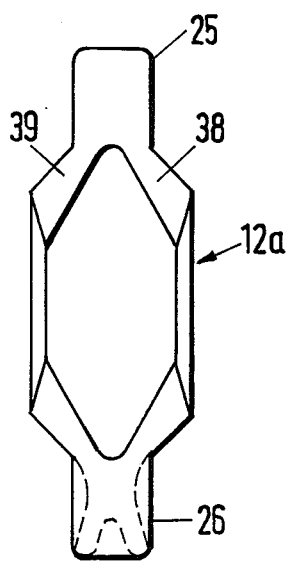
FIG. 5 shows the seal according to FIG. 4 in side view.
Figure 6:
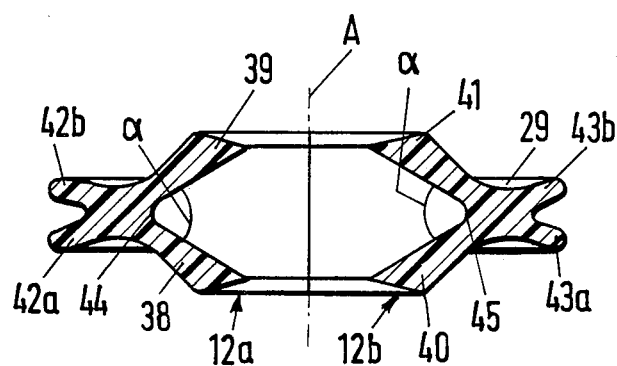
FIG. 6 shows a section along the line VI—VI in FIG. 4.

The ends 25 to 28 of the sealing parts 12a, 12b are of solid design and have approximately rectangular cross section (FIGS. 4 to 6). The legs 42a, 42b, and 43a, 43b extend radially outward and are connected to the thickened ends 25 to 28. The sealing parts 12a, 12b project with these thickened ends slightly over the front sides of the housing halves 6a, 6b which face each other. When the housing halves are screwed together, the thickened ends 25 to 28 of the sealing parts 12a, 12b lie with their front sides against each other and are pressed together elastically as a result of their overhang. This ensures a good seal in the area of the junction plane E. The solid ends 25 to 28 can safely take up the resulting forces. The sealing lips 38 to 41 are also provided in the area of the thickened ends 25 to 28 so that they extend over the entire circumference of the seal formed by the two sealing parts 12a, 12b.

To connect and seal the cables 2 to 5, the halves of the cable distributing box housing 1 and the sealing housing 6, which are prefabricated and pre-mounted on the sealing parts, are placed above the wired cables 2 to 5 and the housing halves are connected together again tightly by means of screws to form a prefabricated component.

Depending on the diameter of the cable to be sealed, the end sections 15a to 15b of the sealing housing 6 are cut off at the corresponding predetermined breaking points 29a to 31a and 29b to 31b. Each sealing housing 6 can be matched to the cable to be sealed on the spot. Prior to use, the sealing housing is closed by the housing base 16a, 16b so that during storage no dirt can penetrate. To use, the housing base 16a, 16b, is cut off at least at the outer predetermined breaking points 31a, 31b. If the smallest seal 14 is sufficient for the cable to be sealed, no further part of the sealing housing 6 need be cut off. With greater cable diameters, the sealing housing 6 must be cut off at the predetermined breaking points 30a, 30b or 29a, 29b. The seals 12 to 14 in each case overlap a corresponding diameter range of the cables to be sealed, so that a very large diameter range can be covered by the three seals.

As a result of the described embodiment of the sealing housing 6, it is not even necessary to know the diameters of the cables to be connected before sealing. Rather, matching the various cables with different diameters is possible simply and quickly on site, since, depending on the requirements, the appropriate sealing part 12, 13, 14 can be used.

It is also easy, with a corresponding length of the sealing housing, to arrange further sealing parts with greater or smaller diameters in it, so that an even greater cable diameter range can be covered. The cables are reliably sealed in each case in the inlet into the cable distributing box housing 1 or in another similar housing by means of sealing parts, so that the wired area within the cable distributing box housing 1 itself need not be sealed.

The apparatus described is also suitable for sealing points where the cables are damaged in order to temporarily seal these points.

What is claimed is:

1. An apparatus for sealing joined conductors of cables, comprising:
   (a) a distributing box housing through which extends cables to be sealed, said box housing comprising separate housing sections adapted to be sealably connected,
   (b) sealing housings associated with said box housing and through which said cables extend into said box housing, each of said sealing housings comprising sealing housing sections adapted to be sealably secured together to form said sealing housing, and
   (c) a plurality of axially spaced, flexibly resilient sealing parts mounted in each of said sealing housing sections, said sealing parts having different inner diameters to firmly press and seal cables of various diameters extending through the sealing housing when said sealing housing sections are assembled, and wherein
   (d) said sealing housing has at least one predetermined breaking point by means of which the sealing housing can be broken off at such point to expose the appropriate size sealing part for a particular cable diameter.

2. An apparatus as claimed in claim 1, wherein a plurality of predetermined breaking points are provided in said sealing housing, each being formed by indentations in the outer side of said sealing housing, a breaking point being formed between spaced sealing parts and between the outermost sealing part and the outer end of the sealing housing.

3. An apparatus as claimed in claim 2, wherein said sealing housing tapers inwardly toward the axis of said sealing parts in a direction away from said distributing box, said outermost tapered end of the sealing housing being closed off by an integral closure plate, and wherein said predetermined breaking point is between said closure plate and the outermost sealing part, whereby said closure plate can be broken off and said outermost sealing part exposed to receive the cable.

4. An apparatus as claimed in claim 1, wherein said cable distributing box housing and said sealing housing have a longitudinal center plane, and said sections of said sealing housing adjoin in a junction plane, said junction plane coinciding with the longitudinal center plane of said cable distributing box housing and said sealing housing.

5. An apparatus as claimed in claim 4, wherein said sealing housing sections are sealed by means of a groove formed in one of said sections and extending in the junction plane, and a seal arranged in said groove.

6. An apparatus as claimed in claim 4, wherein said sealing parts have free ends adapted to be mounted in grooves formed in said sealing housing sections, said free ends being relatively thicker than the remaining portion of said sealing parts and projecting into the junction plane of the sealing housing.

7. An apparatus as claimed in claim 1, wherein said sealing housing and cable distributing box housing consist of a damp-proof material, preferably plastic or aluminum.

8. An apparatus as claimed in claim 1, wherein said resilient sealing parts comprise sealing lips adapted to forcibly press and seal the contact area between said lips and the cable extending between said lips.

9. An apparatus for sealing joined conductors of cables, comprising:
   (a) a distributing box housing through which extends cables to be sealed, said box housing comprising separate housing sections adapted to be sealably connected,
   (b) sealing housings associated with said box housing and through which said cables extend into said distributing box, each of said sealing housings comprising sealing housing sections adapted to be sealably secured together to form said sealing housing, each of said sealing housing sections being formed with at least one radially inner receiving groove, (c) at least one flexibly resilient sealing part carried by each of said sealing housing sections, said sealing parts being axially aligned and formed with flexibly resilient sealing means adapted to firmly press and seal the cable extending through the sealing housing when said sealing housing sections are assembled, said sealing parts being further formed with securing parts by means of which they are secured in said grooves, said securing parts comprising at least two legs which are approximately V-shaped relative to each other and which extend radially outward, said legs when laterally compressed permitting said securing parts to be positioned under pretension in the associated receiving grooves.

10. An apparatus as claimed in claim 9, wherein each of said sealing parts comprise at least two axially adjacent and radially inward projecting sealing lips which become wider radially inwards in the direction of their cable contacting edges.

* * * * *